United States Patent
Reznikov (10) Patent No.: US 7,251,145 B1
(45) Date of Patent: Jul. 31, 2007

(54) INJECT/EJECT MECHANISM FOR CIRCUIT BOARDS

(75) Inventor: Naum Reznikov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/920,663

(22) Filed: Aug. 18, 2004

(51) Int. Cl.
*H02B 1/01* (2006.01)

(52) U.S. Cl. ....................... 361/825; 361/801

(58) Field of Classification Search ............. 361/727, 361/728, 731, 735, 736, 741, 748, 798, 726, 361/825, 801; 439/368, 327
See application file for complete search history.

(56) References Cited

U.S. PATENT DOCUMENTS

| | | | |
|---|---|---|---|
| 3,193,342 A | 7/1965 | Sauter | |
| 3,566,190 A * | 2/1971 | Huebner et al. | 361/690 |
| 3,899,794 A | 8/1975 | Brown, Jr. | |
| 4,365,831 A | 12/1982 | Bourne | |
| 4,421,372 A | 12/1983 | Golden | |
| 4,511,950 A * | 4/1985 | Bunner et al. | 361/788 |
| 4,597,173 A | 7/1986 | Chino et al. | |
| 4,778,401 A | 10/1988 | Boudreau et al. | |
| 4,872,853 A | 10/1989 | Webster | |
| 4,941,841 A | 7/1990 | Darden et al. | |
| 4,947,288 A * | 8/1990 | Olsson et al. | 361/788 |
| 5,003,431 A | 3/1991 | Imsdahl | |
| 5,023,754 A * | 6/1991 | Aug et al. | 361/800 |
| 5,172,520 A | 12/1992 | Hostetler et al. | |
| 5,222,897 A | 6/1993 | Collins et al. | |
| 5,229,919 A | 7/1993 | Chen | |
| 5,255,154 A | 10/1993 | Hosoi et al. | |
| 5,259,783 A * | 11/1993 | Hileman et al. | 439/372 |
| 5,332,306 A | 7/1994 | Babb et al. | |
| 5,442,513 A | 8/1995 | Lo | |
| 5,483,419 A | 1/1996 | Kaczeus, Sr. et al. | |
| 5,504,648 A | 4/1996 | Honda et al. | |
| 5,506,758 A | 4/1996 | Cromwell | |
| 5,548,483 A * | 8/1996 | Feldman | 361/737 |
| 5,557,499 A | 9/1996 | Reiter et al. | |
| 5,563,767 A | 10/1996 | Chen | |
| 5,629,836 A * | 5/1997 | Wright | 361/755 |
| 5,653,518 A | 8/1997 | Hardt | |
| 5,654,873 A | 8/1997 | Smithson et al. | |
| 5,673,172 A | 9/1997 | Hastings et al. | |
| 5,691,859 A | 11/1997 | Ulrich et al. | |
| 5,734,557 A | 3/1998 | McAnally et al. | |
| 5,765,933 A | 6/1998 | Paul et al. | |
| 5,810,613 A * | 9/1998 | Ati et al. | 439/157 |
| 5,980,281 A | 11/1999 | Neal et al. | |
| 6,056,567 A | 5/2000 | Schell | |
| 6,067,225 A | 5/2000 | Reznikov et al. | |
| 6,097,605 A * | 8/2000 | Klatt et al. | 361/737 |

(Continued)

*Primary Examiner*—Dean A. Reichard
*Assistant Examiner*—Yuriy Semenenko
(74) *Attorney, Agent, or Firm*—Meyertons Hood Kivlin Kowert & Goetzel, P.C.; B. Noël Kivlin (57) ABSTRACT

A mechanism may couple an electrical assembly with circuit boards in a computer system. The mechanism may include injectors on the electrical assembly and a receptacle on each of the circuit boards. The injectors may engage the receptacles to couple header connector parts on the electrical assembly with receptacle connector parts on the receptacles. The electrical assembly may include a latch device that holds the injectors in a closed position after injection of the electrical assembly.

22 Claims, 9 Drawing Sheets

U.S. PATENT DOCUMENTS

| | | |
|---|---|---|
| 6,154,373 A * | 11/2000 | Durston et al. ............. 361/788 |
| 6,193,339 B1 | 2/2001 | Behl et al. |
| 6,252,514 B1 | 6/2001 | Nolan et al. |
| 6,288,902 B1 | 9/2001 | Kim et al. |
| 6,373,713 B1 | 4/2002 | Jensen et al. |
| 6,378,965 B1 | 4/2002 | Reznikov et al. |
| 6,413,122 B2 | 7/2002 | Fujioka |
| 6,433,825 B1 | 8/2002 | Cama et al. |
| 6,519,162 B1 * | 2/2003 | Witty et al. ................. 361/796 |
| 6,545,611 B2 * | 4/2003 | Hayashi et al. .......... 340/686.4 |
| 6,618,264 B2 | 9/2003 | Megason et al. |
| 6,762,934 B2 | 7/2004 | Kitchen et al. |
| 6,771,510 B1 * | 8/2004 | Novak et al. ................ 361/727 |
| 6,795,307 B2 | 9/2004 | Arbogast et al. |
| 6,798,650 B2 | 9/2004 | Reznikov et al. |
| 6,802,117 B2 | 10/2004 | Dalisay |
| 6,950,313 B1 * | 9/2005 | Shih .......................... 361/759 |

\* cited by examiner

INJECT/EJECT MECHANISM FOR CIRCUIT BOARDS

BACKGROUND OF THE INVENTION

1. Field of the Invention

This invention relates generally electronic equipment, such as computers, and, more particularly, to apparatus for coupling electrical assemblies to circuit boards.

2. Background Information

Electronic systems such as computers are typically constructed in a modular fashion from circuit boards, each circuit board generally performing a specific function. Each circuit board requires multiple electrical connections, which are generally provided by two part multi-contact electrical connectors. One part of the connector is mounted to the circuit board, while a mating part of the connector may be attached to another component of the system such as a rack, a chassis, a cable, or another circuit board (e.g., backplane circuit board). Successful mating of connector parts is needed for reliable electrical connections in the system.

A number of mechanisms are known for injecting a circuit board into a chassis or extracting a circuit board from a chassis. Such mechanisms may include lever arms pivotally coupled to the circuit board and arranged to engage projections formed on the chassis. Guide formations may be provided on the chassis to receive the circuit board and to guide the circuit board into position such that electrical connector parts mate with one another. The lever arms may be arranged on the circuit board so that when the lever arms are actuated, the circuit board is provided with a biasing force that serves to move the circuit board toward the rear of the chassis, thereby mating the parts of the electrical connector.

For circuit boards with connectors having a relatively large number of pins, large insertion forces may be required to mate the connector parts. For example, a large board may contain several multi-contact connectors, each connector containing several hundred individual contacts. Each contact requires the application of an insertion force to seat the contact. Thus, the total insertion force required to seat a large board may be 65 pounds or more. Moreover, individual contacts are easily damaged if the mating connector parts are not properly aligned when they come into contact with each other. This problem is especially acute where large forces are required to mate the connector parts.

Electrical connections may be made among various circuit boards in a chassis or between circuit boards in a chassis and components external to the chassis. Such connections may be provided through a backplane circuit board to which the other circuit boards are mutually installed. In some cases, a backplane circuit board does not provide all of the connections needed for a system. In addition, a backplane circuit board may not provide optimal (e.g., minimum length) routing of conductors in a system. Electrical connections can be made using cables between the boards or other components. Installation of cables for a large system, however, may be difficult and laborious. Furthermore, in some cases the use of cables in lieu of circuit boards may result in slower connections between components. In addition, connectors may be susceptible to damage during installation of such cables due to misalignment of connectors.

Circuit boards may encounter a variety of external loads. Some loads relate to environmental conditions while in service, such as shock or vibration. Other loads are encountered during assembly, such as those applied during installation or removal of components on the circuit board or other elements in a system. In either case, the loads may cause separation of or damage to individual contacts, reducing reliability of the system.

It would be beneficial to have an improved mechanism for inserting and ejecting electrical assemblies to and from circuit boards. It would further be beneficial to have an improved electrical assembly that promotes a reliable connection between circuit boards when a system encounters external loads.

SUMMARY OF THE INVENTION

In an embodiment, an inject/eject mechanism may couple an electrical assembly to circuit boards in a system. The electrical assembly may provide electrical and/or optical connections between the circuit boards or between the circuit boards and other components. The mechanism may include at least one injector on the electrical assembly and at least one receptacle on one or more of the circuit boards. In some embodiments, a mechanism may include a pair of injectors coupled on opposing sides of the electrical assembly. The injectors may engage receptacles on each of the circuit boards to couple the electrical assembly to the circuit boards. Header connector parts on the electrical assembly may couple with receptacle connector parts on each of the receptacles. In some embodiments, the injectors may be operated to engage the receptacles to decouple the electrical assembly from the circuit boards.

In an embodiment, an electrical assembly may include a plurality of header connector parts, a base, and a pair of injectors. The pair of injectors may be movably (e.g., pivotally) coupled to the base. The injectors may engage portions of receptacles on circuit boards to couple the electrical assembly to the circuit boards. In some embodiments, the injectors may include projecting rims that engage hooks on a receptacle bracket. The electrical assemblies may include guide pins that couple with guide holes in the receptacles. In some embodiments, the electrical assembly may include a circuit board. The circuit board may provide connections between the header connector parts on the electrical assembly.

In an embodiment, an electrical assembly may include a latch device for latching injectors of an inject/eject mechanism. The latch device may couple with the injectors to inhibit rotation of the injectors relative to a base when the electrical assembly is fully installed on circuit boards. The latch device may include a release to unlatch the injectors. In some embodiments, the latch device may include a resilient member. The release may displace portions of the resilient member to release the injectors.

In an embodiment, a system may include a plurality of circuit boards. The circuit boards may mounted in a chassis in a spaced parallel relationship. An electrical assembly may be coupled two or more of the circuit boards. The electrical assembly may include header connector parts that couple with a receptacle connector part on each of the circuit boards. The electrical assembly may provide electrical connections between the parallel circuit boards.

In another embodiment, a plurality of circuit boards may be arranged in a substantially co-planar array. The circuit boards may be coupled to each other using electrical assemblies. The circuit boards may combine to form a composite circuit board. The composite circuit board may be installed as a unit into a chassis or rack structure.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

A computer system may include components installed in a chassis or rack assembly. As used herein, "chassis" includes any structure that supports or houses one or more elements of a computer system (e.g., electronic modules). A component may be supported in a chassis by various structures including, but not limited to, slides, rails, a shelf, or a bottom wall of a chassis.

As used herein, "circuit board" includes any assembly or structure that carries electrical components (including, but not limited to, semiconductor devices, resistors, capacitors, relays, switches, and connectors) or conductors for an electrical system. "Circuit board" includes, but is not limited to, a printed circuit board made of fibreglass and metal layers. As used herein, "component" includes any element of system, including, but not limited to, a power supply, a disk drive, or a printed circuit board.

Figure 1:
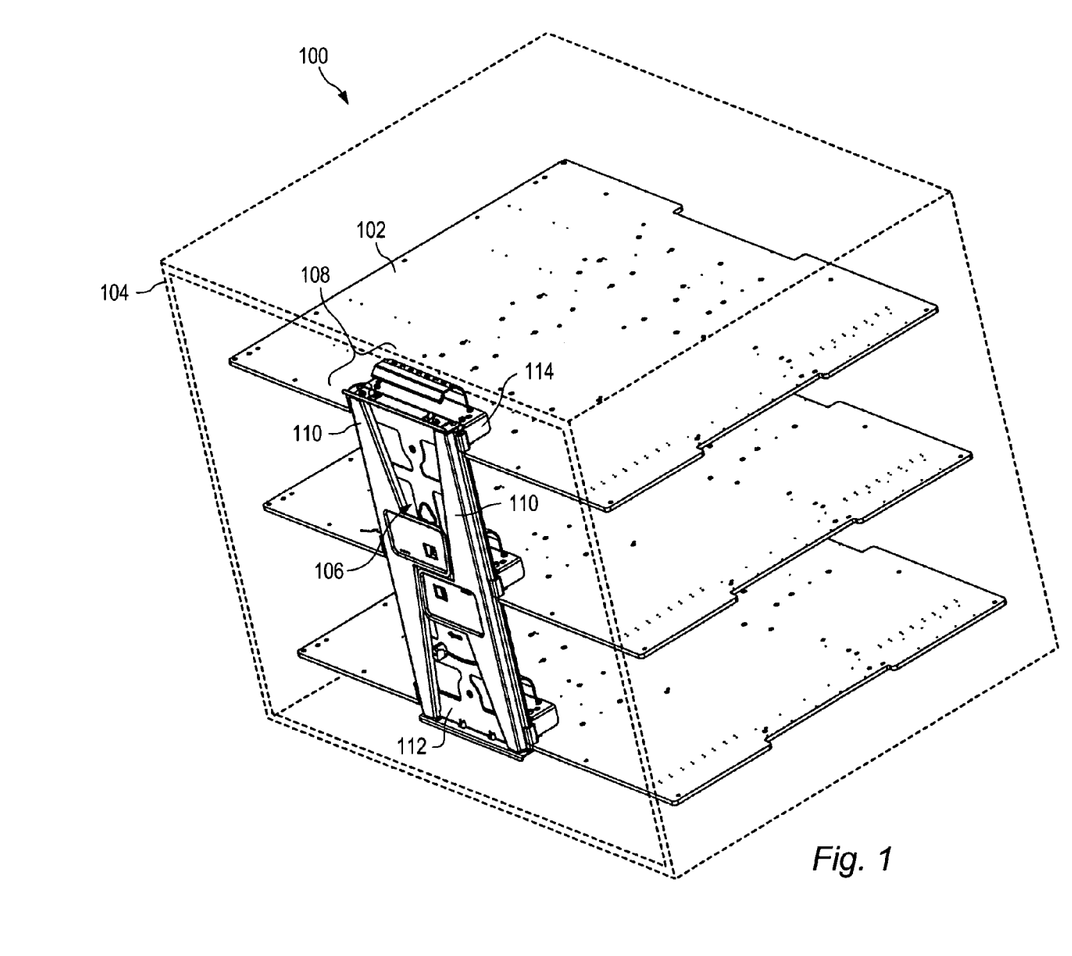
FIG. 1 depicts an embodiment of an electrical assembly with a inject/eject mechanism coupled to circuit boards in a chassis.

FIG. 1 depicts computer system 100 including circuit board 102 in chassis 104. Circuit boards 102 may be mounted in chassis 104 by rails, slides, card guides, or other mounting hardware. In some embodiments, circuit boards 102 may be coupled to a common backplane circuit board near a rear of the chassis.

Computer system may include electrical assembly 106. As used herein, "electrical assembly" includes any assembly that provides electrical or optical (e.g., fiber optic) connections for a system or carries electrical or optical components for a system. An electrical assembly may include a circuit board with header connector parts. The header connector parts may couple with mating connector parts on circuit boards (e.g., circuit boards 102) to provide electrical connections among the circuit boards and/or between the circuit boards and external components. In some embodiments, an electrical assembly may serve as a bridgeboard that provides connections between two or more adjacent circuit boards. The bridgeboard may provide more efficient routing in a system (e.g., allow for shorter paths between components).

Computer system 100 may include inject/eject mechanism 108. Inject/eject mechanism 108 may be operated to couple and decouple electrical assembly 106 from circuit boards 102. Inject/eject mechanism 108 may include injectors 110. As used herein, "injector" includes any element or elements that may be used to inject or eject a component from a system. As used herein, to "inject" generally means to couple one component to a system or another component. As used herein, to "eject" generally means to decouple a component from a system or another component. Examples of injectors include, but are not limited to, levers, screws, rods, cams, hooks, or pins. As shown in FIG. 1, injectors 110 may pivotally couple to base plate 112 on electrical assembly 106.

Inject/eject mechanism 108 may include receptacles 114 on circuit boards 102. Receptacles 114 may include receptacle connector parts. The receptacle connector parts may mate with header connector parts on electrical assembly 106. Injectors 110 may be operated to selectively inject and eject electrical assembly 106 from receptacles 114.

Figure 2:
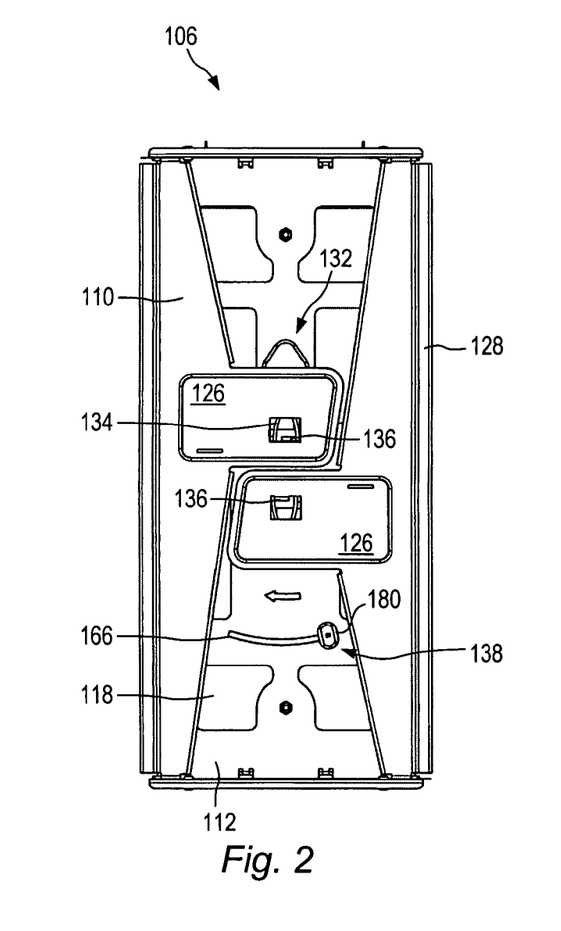
FIG. 2 depicts a front view of an electrical assembly including a pair of injectors.
Figure 3:
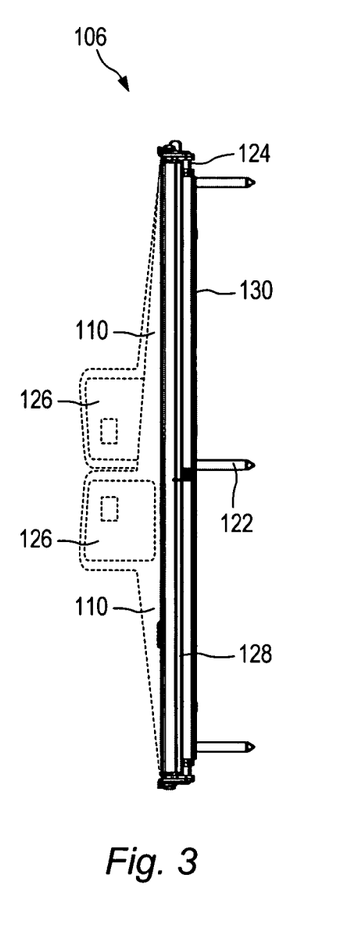
FIG. 3 depicts a side view of an electrical assembly including a pair of injectors.
Figure 4:
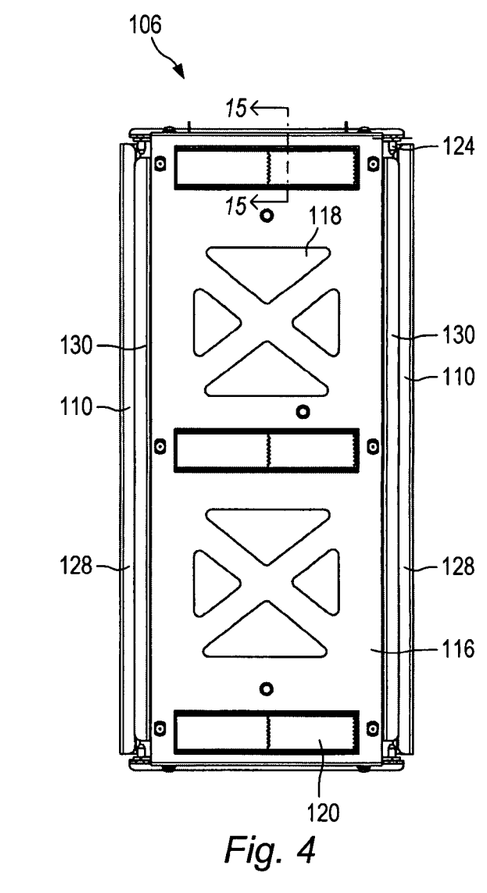
FIG. 4 depicts a perspective view of an electrical assembly including header connector parts and injectors.

FIG. 2 depicts a front view of electrical assembly 106. FIG. 3 depicts a side view of electrical assembly 106. FIG. 4 depicts a rear view of electrical assembly 106. As shown in FIG. 4, electrical assembly 106 may include bottom plate 116. Header circuit board 118 may be provided between base plate 112 and bottom plate 116. Header connector parts 120 may be included on header circuit board 118. Header connector parts 120 may include electrical contacts (e.g., pins, sockets, or a combination of both) and/or optical contacts (e.g., fiber optic termini). Electrical assembly 106 may include guide pins 122. Guide pins 122 may facilitate alignment of electrical assembly 106 with receptacles 114 (shown in FIG. 1).

Injectors 110 may be pivotally attached to the left and right sides of base plate 112 on hinge pins 124. Injectors 110 may include handle portions 126 and projecting rims 128. Projecting rims 128 may engage portions of receptacles 114 during injection and/or ejection of electrical assembly 106. Examples of other types of engaging members that may be used for an inject/eject mechanism include, but are not limited to, hooks, tabs, cams, screws, bolts, or pins. Base plate 112 may include stops 130. Projecting rims 128 may contact stops 130 to limit rotation of injectors 110. In some embodiments, as shown in FIG. 1, a single injector on an electrical assembly may engage multiple receptacles. In other embodiments, an electrical assembly may include one or more separate injectors for each receptacle.

In some embodiments, an inject/eject mechanism may include a latch device. The latch device may hold one or more injectors of an inject/eject mechanism in a closed position. A latch for a latch device may be of various types, including, but not limited to, a push knob latch, coil spring latch, or touch latch. As shown in FIG. 2, inject/eject mechanism 108 may include latch device 132. Latch device 132 may include latch spring 134. Latch spring 134 may be attached to base plate 112. Latch spring 134 may resiliently engage catches 136 on injectors 110 when injectors 110 are closed against base plate 112. Electrical assembly 106 may include release 138. Release 138 may be operated to release latch spring 134 to allow injectors 110 to be rotated away from base plate 112. FIG. 3 shows in dashed lines a pair of injectors in a partially open position after latch spring 134 has been released.

Figure 5:
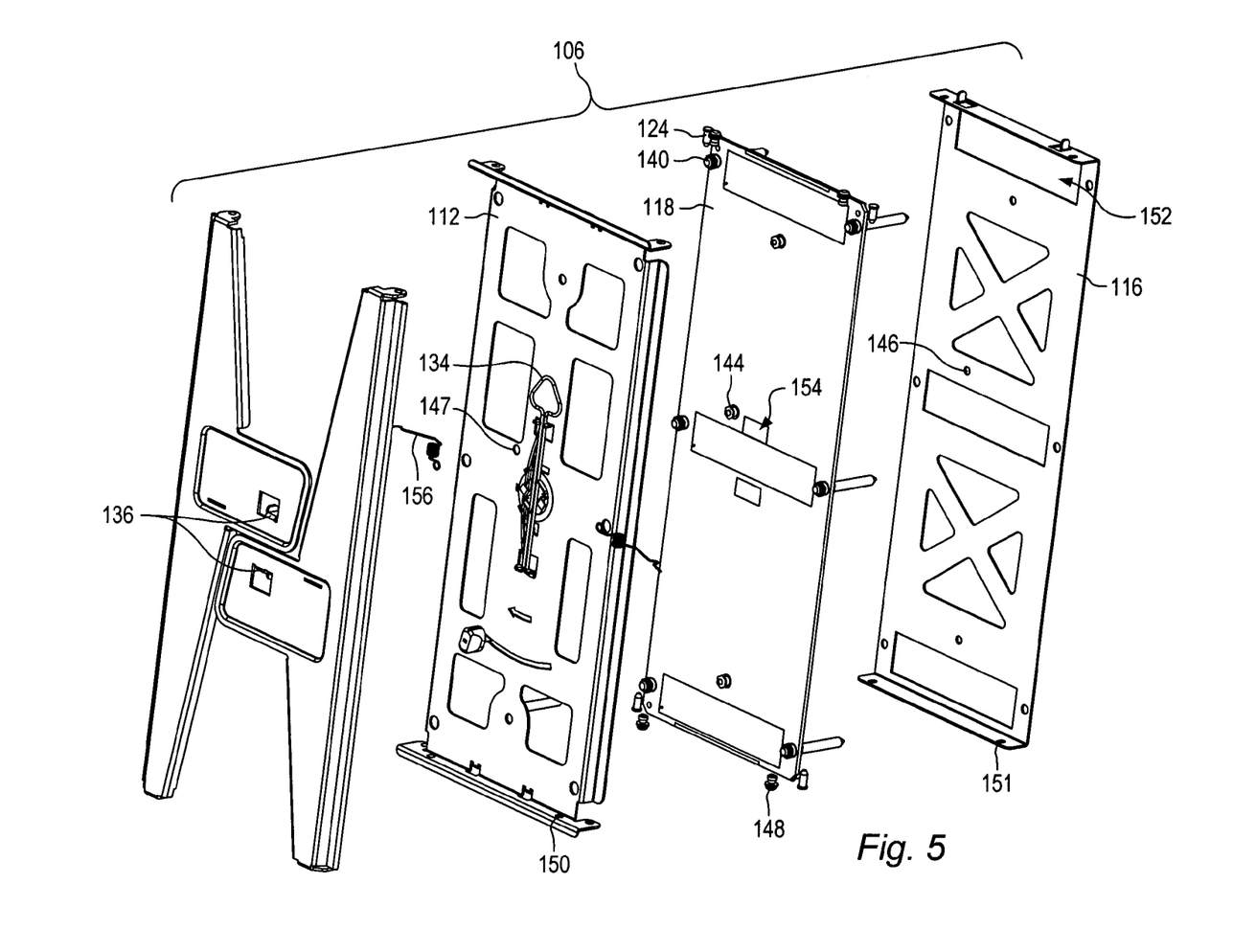
FIG. 5 depicts an exploded view of electrical assembly including multiple header connector parts and a pair of injectors.

FIG. 5 depicts an exploded view of electrical assembly 106. As shown in FIG. 5, a base for an electrical assembly may be a plate. A base for an electrical assembly may have various other forms, including, but not limited to, a block, a frame, a ring, or an irregular shape. In certain embodiments, a base may be a printed circuit board. Fasteners 140 may be used to couple guide pins to base plate 112, header circuit board 118, and bottom plate 116. Fasteners 144 may be used to couple base plate 112 to bottom plate 116 at holes 146 on bottom plate 116 and holes 147 on base plate 112. Fasteners 148 may be used to attach header circuit board 118 at holes 150 in base plate 112 and holes 151 in bottom plate 116. Fasteners may be selected to provide clearance between header circuit board 118 and base plate 112 and between header circuit board 118 and bottom plate 116. Bottom plate 116 may include apertures 152 for passage of header connector parts 120 (shown in FIG. 4). Header circuit board 118 may include cutouts 154 to allow for clearance of catches 136 on injectors 110.

Torsion springs 156 may be installed between base plate 112 and injectors 110. Fasteners 140 may retain torsion springs 156 in position on base plate 112. Torsion springs 156 may be biased to urge injectors 110 away from base plate 112 when latch spring 134 is released. In some embodiments, torsion springs 156 may rotate injectors 110 away from base plate 112 by a predetermined amount. In one embodiment, torsion springs cause injectors to rotate about 15° away from base plate 112 when latch spring 134 is released. Rotation of injectors 110 away from base plate 112 may help keep injectors 110 from being unintentionally latched by latch spring 134 during use of injectors 110.

Figure 6:
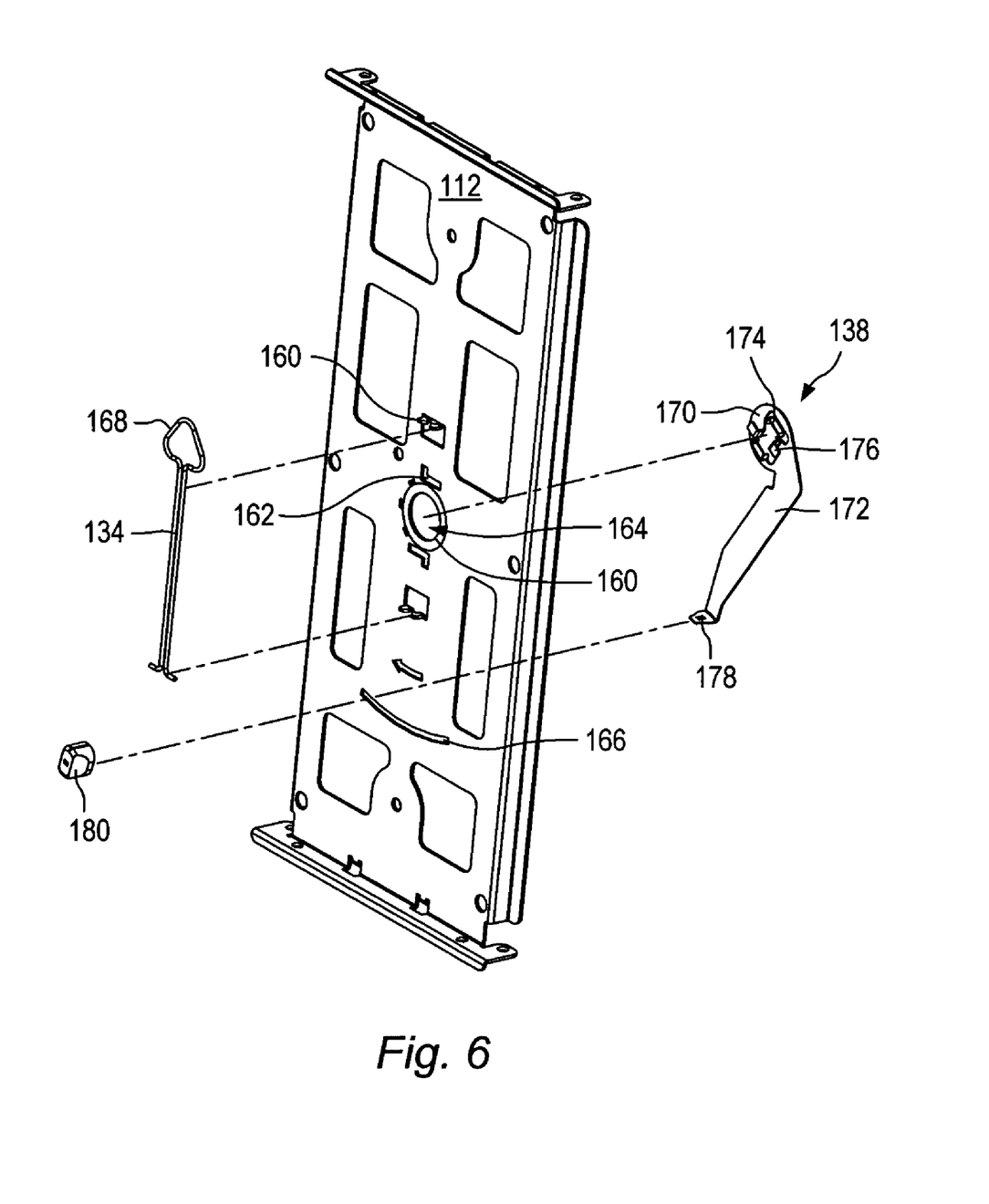
FIG. 6 depicts an exploded view of a base plate for an electrical assembly and a latch device for a pair of injectors.

FIG. 6 depicts an exploded view of base plate 112 and elements of latch device 132. Latch spring 134 may snap into snap hooks 160 on base plate 112. Loop 168 on latch spring 134 may be used to hold and position latch spring 134 during installation in snap hooks 160. Base plate 112 may include catch slots 162, nest 164, and curved slot 166. In some embodiments, loop 168 on may provide a visual indicator of the position of latch spring 134 during use of latch device 132.

Release 138 may include hub 170 and arm 172. Hub 170 may include centering tabs 174 and release hooks 176. Arm 172 may include bend 178. Release 138 may be installed on base plate 112 such that centering tabs 174 and release hooks 176 pass through nest 164 and bend 178 passes through curved slot 166. Cap 180 may be coupled to bend 178 (e.g., by snap-on engagement). Centering tabs 174 may rotatably slide against the circumferential wall of nest 164. Arm 172 may be used to rotate hub 170 by sliding cap 180 from side to side over curved slot 166.

Figure 7:
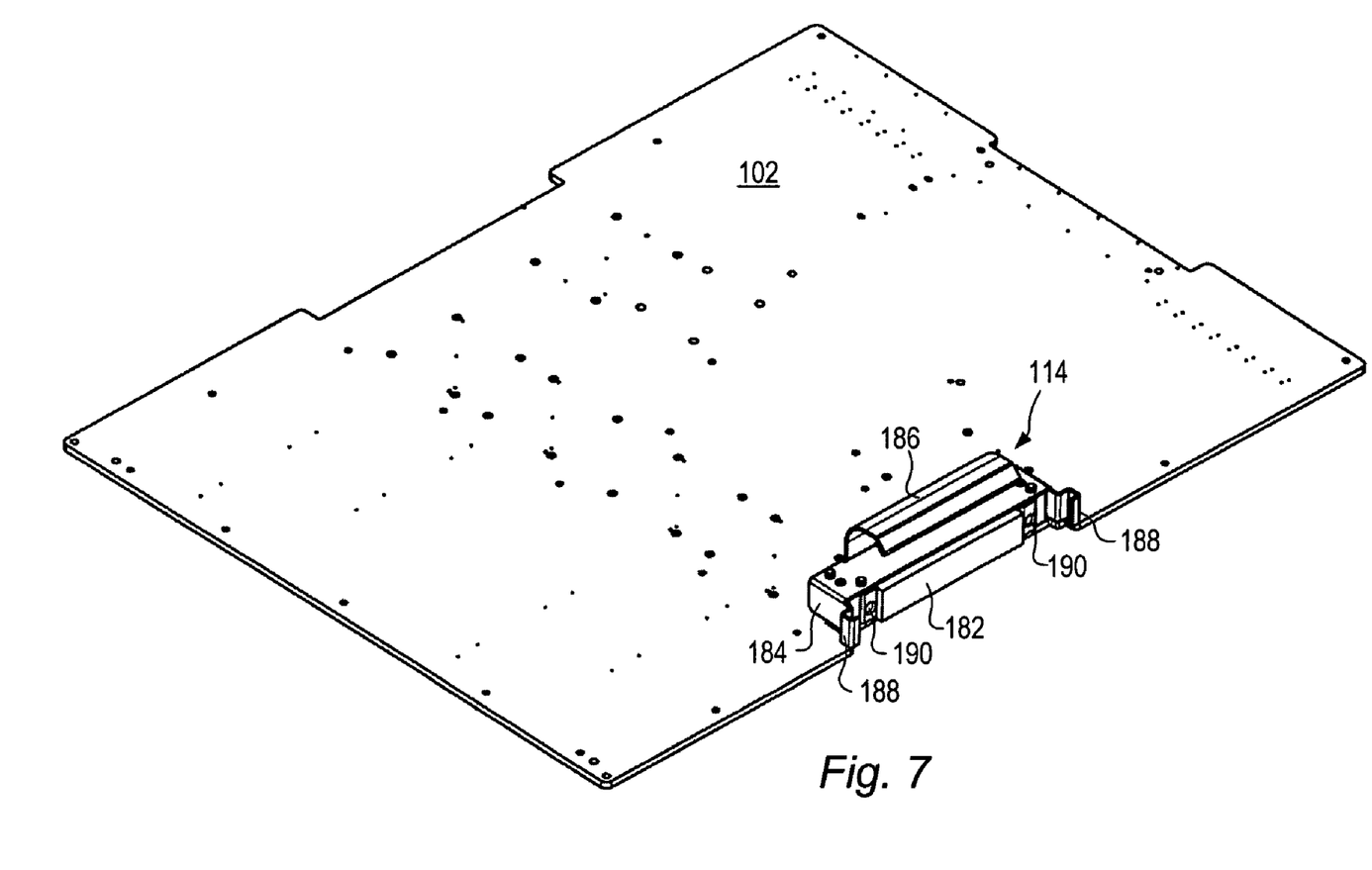
FIG. 7 depicts a circuit board including a receptacle of an inject/eject mechanism.

FIG. 7 depicts receptacle 114 on circuit board 102. Receptacle 114 may include receptacle connector part 182. Receptacle connector part 182 may be mounted on bracket 184. Receptacle connector part 182 may include electrical contacts (e.g., pins, sockets, or a combination of both) and/or optical contacts. Contacts in receptacle connector part 182 may be complementary to those of a corresponding header connector part.

Bracket 184 may include carrying handle 186. Carrying handle 186 may be used to facilitate installation and/or maintenance of circuit board 102. Carrying handle may reduce a risk of user contact with active components on circuit board 102. In one embodiment, bracket 184 is made of cold rolled steel. Bracket 184 may be made of various other materials, including, but not limited to, stainless steel, aluminum, or a polymer (e.g., polyvinyl chloride, ABS).

Bracket 184 may include hooks 188. Hooks 188 may engage with a portion of an injector on electrical assembly 106 (shown in FIG. 1) to facilitate injection and/or ejection of the electrical assembly. Hooks on a receptacle may have any of a variety of shapes, including, but not limited to, a "C"-shape, an "L"-shape, or an arc shape. A receptacle may include various other elements for engaging a portion of an injector, including, but not limited to, tabs, apertures, rings, or loops.

Receptacle 114 may include guide holes 190. In some embodiments, guide holes 190 may be fitted with bushings 192. Guide holes 190 may receive guide pins 122 (shown in FIG. 3) on electrical assembly 106. Guide pins 122 and guide holes 190 may facilitate proper alignment of the respective electrical contacts in header connector part 120 and receptacle connector part 182. Proper alignment of electrical contacts between a receptacle connector part and a header connector part may reduce a risk of damage to contacts during installation of an electrical assembly. In some embodiments, tolerances between guide pins and guide holes may be controlled to establish a close fit between the guide pins and the guide holes. Guide pins may carry some of the mechanical loads (e.g., vibration loads) between parts of a connector, reducing loads on electrical contacts in the connector.

Figure 8:
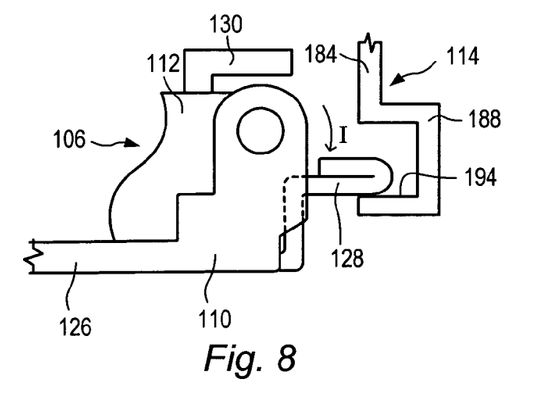
FIG. 8 depicts a top view of an injector on an electrical assembly engaging a bracket on a receptacle during injection of the electrical assembly onto a circuit board.
Figure 9:
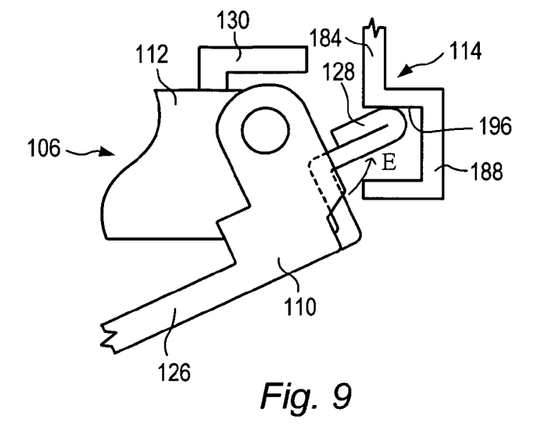
FIG. 9 depicts a top view of an injector on an electrical assembly engaging a bracket on a receptacle during ejection of the electrical assembly from a circuit board.
Figure 10:
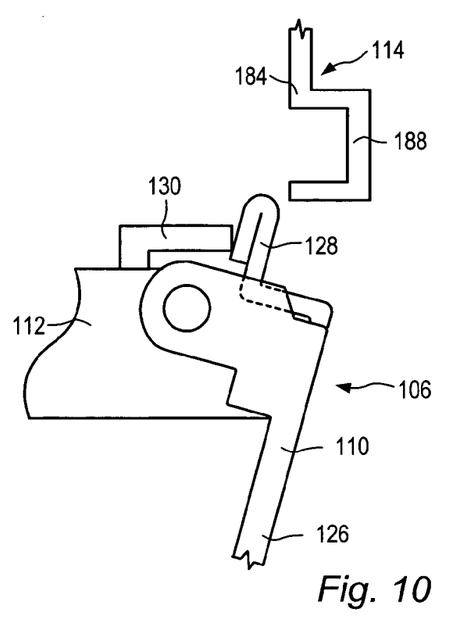
FIG. 10 depicts a top view of an injector held by a stop on an electrical assembly.

FIGS. 8–10 depict detail views of engagement of injector 110 with receptacle bracket 184. To inject electrical assembly 106 into receptacles 114, a user may move handle portions 126 of injectors 110 toward base plate 112. Projecting rims 128 may move in the direction of arrow I on FIG. 8 to engage rearward facing surfaces 194 of hooks 188. Engagement of projecting rims 128 with hooks 188 may cause electrical assembly 106 to be drawn toward receptacle 114. Injectors 110 may be rotated until handle portions 126 of injectors 110 bottom out against base plate 112. As injectors 110 are rotated, contacts in header connector parts 120 (shown in FIG. 4) may couple with contacts in receptacle connector parts 182 (shown in FIG. 7). Latch spring 134 may couple with catches 136 to inhibit injectors 110 from rotating away from base plate 112. FIG. 8 depicts injector 110 in a closed position following injection of electrical assembly 106 into receptacle 114.

To eject electrical assembly 106 from receptacle 114, latch spring 134 may be released by operating release 138 (shown in FIG. 2). Torsion springs 156 (shown in FIG. 5) may rotate handle portions 126 of injectors 110 away from latch spring 134. A user may manually continue rotation of handle portions 126 of injectors 110 away from base plate 112. Projecting rims 128 may move in the direction of arrow E shown in FIG. 9. projecting rims 128 may engage forward facing surfaces 196 of hooks 188, as shown in FIG. 9. Engagement of projecting rims 128 with forward facing surfaces 196 of hooks 188 may cause electrical assembly 106 to be pushed away from receptacle 114. As injectors 110 are rotated, contacts in header connector parts 120 may decouple from contacts in receptacle connector parts 182. As shown in FIG. 10, projecting rims 128 of injectors 110 may contact stops 130. Contact with stops 130 may inhibit further rotation of injectors 110.

Figure 11:
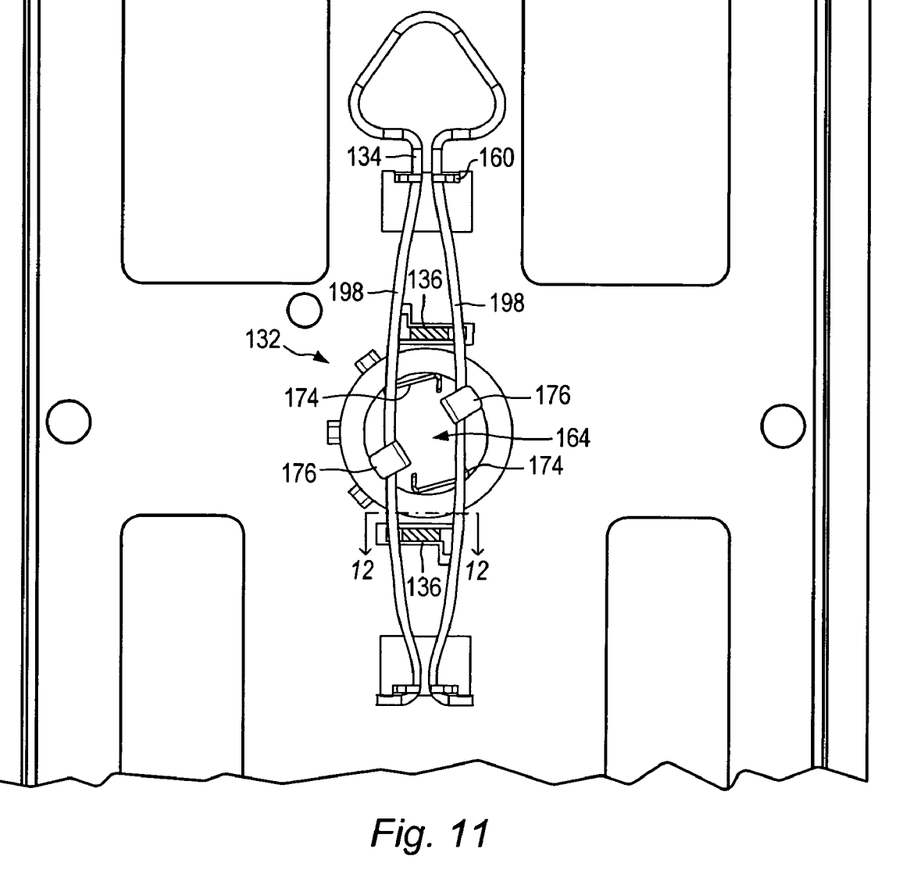
FIG. 11 depicts a front view of a latch in a closed position.

FIG. 11 depicts a front view of latch device 132 in a latched condition. (In FIG. 11, only catches 136 of injectors 110 are shown; the remainder of injectors 110 have been omitted for clarity.) Catches 136 of injectors 110 may be engaged by latch spring 134 to hold injectors 110 in the latched position. Legs 198 of latch spring 134 may be deflected (e.g., bowed outwardly) from their free condition (e.g., from a straight condition as shown in FIG. 6) between snap hooks 160.

Figure 12:
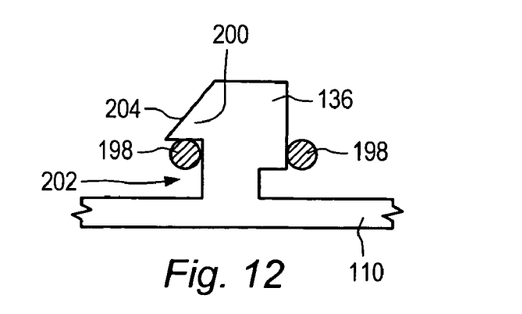
FIG. 12 depicts a cross sectional view of a latch in a closed position taken substantially along lines 12—12 of FIG. 11.

FIG. 12 depicts a top view of catch 136 engaged by legs 198 of latch spring 134. Catches 136 may include projections 200, notches 202, and lead tapers 204. As injectors 110 are moved toward base plate 112, catches 136 may pass between legs 198 of latch spring 134. Lead tapers 204 may deflect legs 198 to facilitate advancement of catches 136 between legs 198. Legs 198 may snap into notches 202 under the spring force of latch spring 134. Engagement of legs 198 on latch spring 134 with projections 200 on catches 136 (as shown in FIGS. 11 and 12) may inhibit rotation of handle portions 126 of injectors 110 away from base plate 112.

Figure 13:
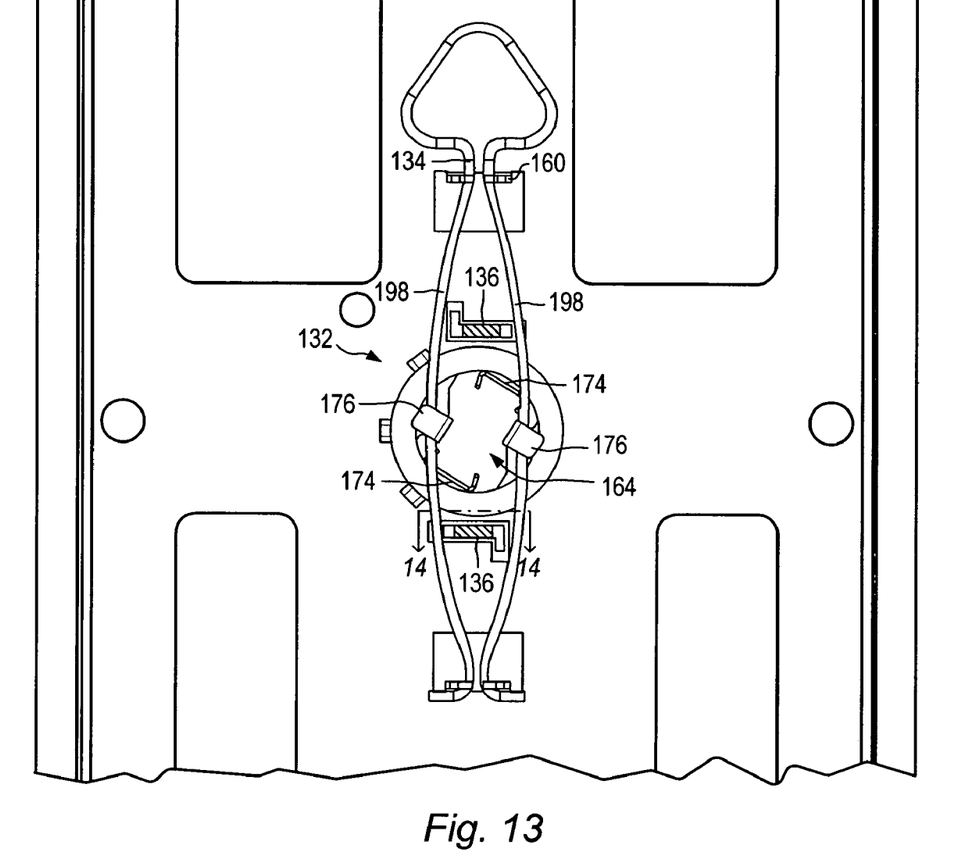
FIG. 13 depicts a front view of a latch in an open position.
Figure 14:
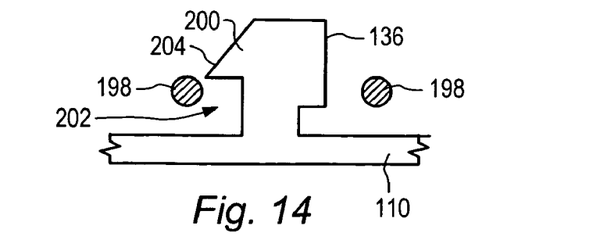
FIG. 14 depicts a cross sectional view of a latch in an open position taken substantially along lines 14—14 of FIG. 13.

FIG. 13 depicts a front view of latch device 132 in an unlatched condition. FIG. 14 depicts a top view of catch 136 when latch device 132 is in an unlatched condition. To unlatch latch device 132, cap 180 (shown in FIG. 2) may be slid from the left side to the right side of curved slot 166. Hub 170 may rotate clockwise on centering tabs 174 relative to nest 164. Release hooks 176 may displace legs 198 of away from each other. Legs 198 of latch spring 134 may be displaced from notches 202 on catches 136. When legs 198 of latch spring 134 clear projections 200 on catches 136, handle portions 126 of injectors 110 may spring away from base plate 112 under the force of torsion springs 156 (shown in FIG. 5). Handle portions 126 of injectors 110 may be actuated by a user to eject electrical assembly 106.

As shown in FIG. 2, handle portions 126 of injectors 110 may overlap each other near the ends of the handle portions 126. Proximity (e.g., overlap) of handle portions on opposing injectors may promote simultaneous operation of injectors (e.g., synchronized rotation of both injectors 110 toward base plate 112) during injection of an electrical assembly. For example, an operator may press on handle portions 126 of both injectors 110 with the palm of one hand to force injectors 110 against base plate 112. Simultaneous operation of opposing injectors may help balance forces on mating connector parts, thereby reducing a risk of damage to electrical contacts.

As described above with respect to FIGS. 13–14, operation of release 138 may simultaneously release both injectors 110 from a closed position. Simultaneous release of opposing injectors may help ensure that any ejection forces applied to connector parts upon release of a latch device (e.g., forces due to torsion springs 156) are evenly applied to the connector parts. Simultaneous release of opposing injectors may also promote simultaneous manual operation of injectors (e.g., synchronized rotation of both injectors 110 away from base plate 112) to eject the electrical assembly.

Figure 15:
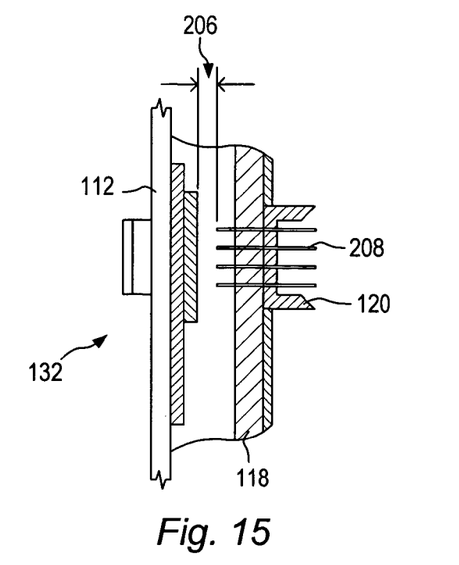
FIG. 15 depicts a cross sectional view of a base plate and a header circuit board taken substantially along lines 15—15 of FIG. 2.

In certain embodiments, a latch device in an electrical assembly may have a low profile. A low profile latch device may provide increased clearance between latch elements and connector pins on a header circuit board. FIG. 15 depicts a cross sectional view of latch device 132 coupled to base plate 112. Clearance 206 may be provided between connector pins 208 and latch device 132. In one embodiment, minimum clearance between metal latch elements and any portion of a connector may be about 2 mm. Increased clearance between header connector contacts may reduce a risk that connector pins inadvertently come into contact with metal elements of a latch device when a system encounters mechanical loads (e.g., installation loads, vibration loads), thereby increasing reliability of the system.

In some embodiments, circuit boards in a chassis may be interconnected using multiple electrical assemblies. For example, electrical assemblies may be coupled to both the front and rear sides of the circuit boards. In certain embodiments, one or more electrical assemblies may eliminate a need for a backplane or midplane circuit board in a system, or allow for a backplane or midplane of a reduced size. Eliminating or reducing the size of a backplane or midplane may reduce complexity of a system and/or improve routing in a system.

Electrical assemblies may be arranged to promote a flow of cooling air over the circuit boards. For example, electrical assemblies may be spaced to allow cooling air to flow between the electrical assemblies. In some embodiments, electrical assemblies may allow for elimination or reduction in the size of backplane or midplane. Elimination or reduction in size of a backplane or midplane may allow for improved flow of cooling air in a system. In certain embodiments, openings may be provided in an electrical assembly to promote the flow of cooling air.

While the circuit boards in FIG. 1 are shown in a parallel spaced relationship to each other, it will be understood that electrical assemblies may be used to couple to circuit boards that have other relative positions and orientations. For example, electrical assemblies may be used to couple circuit boards arranged in a common plane. In one embodiment, two or more circuit boards may be placed in a planar array (e.g., arranged as tiles). Adjacent circuit boards in the array may be coupled to each other using electrical assemblies. The circuit boards in the array may combine to form a composite circuit board. Inject/eject mechanisms may be provided to couple and decouple the electrical assemblies.

Figure 16:
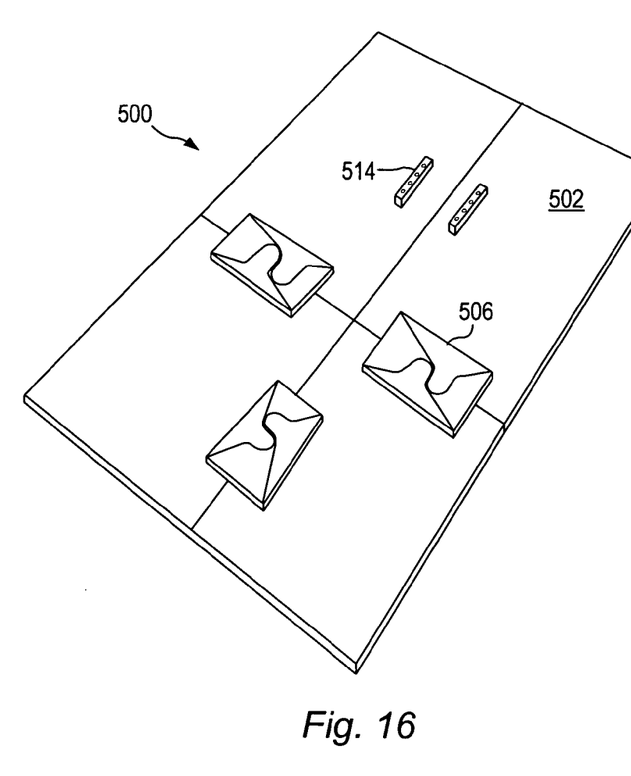
FIG. 16 depicts a system of circuit boards coupled to one another using electrical assemblies.

FIG. 16 depicts an embodiment of composite circuit board 500. Receptacles 514 on circuit boards 502 may be coupled to each other using electrical assemblies 506. Electrical assemblies 506 may be generally of the same form as electrical assembly 106 shown in FIGS. 2–4. Spacing between header connector parts on electrical assemblies 506 may be selected to achieve edge-to-edge coupling between adjacent circuit boards 502. In certain embodiments, structural members such as brackets, straps, or ribs may be attached to circuit boards 502 to structurally reinforce junctions between circuit boards 502. In some embodiments, composite circuit board 500 may be installed as unit into a rack or chassis. Using electrical assemblies to aggregate circuit boards into units may facilitate modular design of electronic systems.

In the context of this patent, the term "coupled" includes direct coupling or indirect coupling (e.g., with one or more intervening elements). For example, an injector and a base may be coupled by directly attaching the injector to the base or by attaching each of the injector and the base to one or more intervening elements (e.g., to a link).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims. For example, when the terms "vertical," "horizontal" "upward", "downward," "under", "over," "left," or "right" are used in the claims, they are to be understood to relate to the Figures as illustrated. However, the device may be turned at an angle to the horizontal or inverted with the quoted terms referring to the altered orientation.

What is claimed is:

1. A mechanism for coupling an electrical assembly with a plurality of circuit boards mounted in a chassis, the electrical assembly comprising a bridgeboard configured to electrically connect a first circuit board of the plurality of circuit boards with a second circuit board of the plurality of circuit boards, the mechanism comprising:
   a first receptacle on the first circuit board of the plurality of circuit boards;
   a second receptacle on the second circuit board of the plurality of circuit boards; and
      a pair of injectors on the electrical assembly on substantially opposing sides of the electrical assembly; wherein one of the pair of injectors comprises a first lever pivotally coupled with the bridgeboard on one side of the bridgeboard, wherein the first lever is configured to, on one side of the bridgeboard, substantially simultaneously engage with both the first receptacle on the first circuit board and the second receptacle on the second circuit board, wherein the other of the pair of injectors comprises a second lever pivotally coupled with the bridgeboard on other side of the bridgeboard, wherein the second lever is configured to, on the other side of the bridgeboard, substantially simultaneously engage with both the first receptacle on the first circuit board and the second receptacle on the second circuit board; and
   wherein the pair of injectors are simultaneously operable to couple the bridgeboard with both the first circuit board and the second circuit board simultaneously.

2. The mechanism of claim 1, wherein the injectors are configurable to engage at least one of the receptacles to decouple the header connector parts from the respective receptacle connector parts.

3. The mechanism of claim 1, further comprising a base coupled to the injectors.

4. The mechanism of claim 3, further comprising a latch device coupled to the base, wherein the latch device is configured to hold the injectors in a closed position relative to the base.

5. The mechanism of claim 1, further comprising at least one guide pin configured to couple with the electrical assembly, wherein at least one of the receptacles comprises a guide hole configured to receive the guide pin when the electrical assembly is coupled with the receptacle.

6. The mechanism of claim 1, wherein both of the pair of injectors are simultaneously operable to couple the header connector parts with the receptacle connector parts by pressing with one hand on portions of both injectors simultaneously.

7. The mechanism of claim 1, further comprising:
   a latch coupled to a base of the electrical assembly and a catch on at least one of the injectors, wherein the latch is configured to couple with the catch to inhibit movement of at least one of the injectors when the header connector part and receptacle connector part are coupled; and
   a latch release coupled to the base, wherein the latch release is configured to release all of the injectors simultaneously.

8. An electrical assembly, comprising:
   a base;
   a first header connector part coupled to the base;
   a second header connector part coupled to the base; and
   a pair of injectors movably coupled to the base; wherein one of the injectors is configured to substantially simultaneously engage both a first receptacle on a first circuit board and a second receptacle on a second circuit board on one side of the electrical assembly and wherein the other of the injectors is configured to substantially simultaneously engage both the first receptacle on the first circuit board and second receptacle on the second circuit board on the other side of the electrical assembly, at least one of the injectors being configurable to engage both the first receptacle on the first circuit board and the second receptacle on the second circuit board to couple the first header connector part with a first receptacle connector part on the first circuit board and to couple a second header connector part on the electrical assembly with a second receptacle connector part on the second circuit board;
   a latch coupled to the base and a catch on at least one of the injectors, wherein the latch is configured to couple with the catch to inhibit movement of at least one of the injectors when the header connector part and receptacle connector part are coupled; and
   a latch release coupled to the base, wherein the latch release is configured to release all of the injectors simultaneously.

9. The electrical assembly of claim 8, wherein the injectors are configurable to engage at least one of the receptacles to decouple the header connector parts from the respective receptacle connector parts.

10. The electrical assembly of claim 8, further comprising a guide pin coupled to each of the header connector parts, wherein each of the guide pins is configured to couple with a guide hole in one of the receptacles.

11. The electrical assembly of claim 8, wherein the latch comprises a resilient member.

12. The electrical assembly of claim 8, wherein the latch comprises a wire spring.

13. The electrical assembly of claim 8, further comprising a spring coupled to the injector, wherein the spring is configured to rotate at least one of the injectors away from the latch when the latch is released.

14. The electrical assembly of claim 8, further comprising a stop configured to inhibit rotation of the injector beyond a predetermined amount.

15. The electrical assembly of claim 8, wherein the latch is configured to hold both of the pair of injectors in a closed position.

16. A system, comprising:
   a first circuit board;
   a first receptacle coupled to the first circuit board, the first receptacle comprising a first receptacle connector part;
   a second circuit board;

a second receptacle coupled to the second circuit board, the second receptacle comprising a second receptacle connector part; and an electrical assembly comprising a base, first and second header connector parts coupled to the base, and a pair of injectors coupled to base; wherein one of the injectors is configured to substantially simultaneously engage both the first receptacle coupled to the first circuit board and the second receptacle coupled to the second circuit board on one side of the electrical assembly and wherein the other of the injectors is configured to substantially simultaneously engage both the first receptacle coupled to the first circuit board and second receptacle coupled to the second circuit board on the other side of the electrical assembly, at least one of the injectors being configured to engage both the first receptacle and the second receptacle to couple the first header connector part to the first receptacle connector part and to couple the second header connector part to the second receptacle connector part;

wherein the electrical assembly comprises a bridgeboard, wherein the bridgeboard is configured to electrically connect the first circuit board with the second circuit board, wherein one of the pair of injectors comprises a first lever pivotally coupled with the bridgeboard on one side of the bridgeboard, wherein the first lever is configured to, on one side of the bridgeboard, substantially simultaneously engage with both the first receptacle coupled to the first circuit board and the second receptacle coupled to the second circuit board, wherein the other of the pair of injectors comprises a second lever pivotally coupled with the bridgeboard on other side of the bridgeboard, wherein the second lever is configured to, on the other side of the bridgeboard, substantially simultaneously engage with both the first receptacle coupled to the first circuit board and the second receptacle coupled to the second circuit board, and wherein the pair of injectors are simultaneously operable to couple the bridgeboard with both the first circuit board and the second circuit board simultaneously.

17. The system of claim 16, further comprising a chassis, wherein the circuit boards are coupled to the chassis in a substantially parallel spaced relationship.

18. The system of claim 16, further comprising a chassis and a second electrical assembly, wherein the circuit boards are coupled to the chassis, wherein the electrical assemblies are configured to allow cooling air to flow over the circuit boards between the electrical assemblies.

19. The system of claim 16, wherein the circuit boards are configured in a substantially coplanar relationship when the header connector parts are coupled to the receptacle connector parts.

20. The system of claim 16, wherein the circuit boards form a composite circuit board, wherein the composite circuit board is mountable in a chassis.

21. The system of claim 16, further comprising a structural member coupled between the circuit boards.

22. The system of claim 16, wherein the first and second levers are simultaneously operable by a user by pressing on both the levers with the same hand.

* * * * *